(No Model.) 2 Sheets—Sheet 1.

W. H. HARDEN.
ANIMAL TRAP.

No. 473,312. Patented Apr. 19, 1892.

WITNESSES:
Jos. A. Ryan
P. B. Turpin.

INVENTOR:
William H. Harden
BY
ATTORNEYS (No Model.) 2 Sheets—Sheet 2.
W. H. HARDEN.
ANIMAL TRAP.

No. 473,312. Patented Apr. 19, 1892.

WITNESSES:
Jos. A. Ryan
P. B. Turpin.

INVENTOR:
William H. Harden.
BY Munn & Co
ATTORNEYS

UNITED STATES PATENT OFFICE.

WILLIAM H. HARDEN, OF QUITMAN, GEORGIA, ASSIGNOR OF ONE-HALF TO WILLIAM L. WILKINSON AND WILLIAM W. WALKER, OF SAME PLACE.

ANIMAL-TRAP.

SPECIFICATION forming part of Letters Patent No. 473,312, dated April 19, 1892.

Application filed May 13, 1891. Serial No. 392,637. (No model.)

*To all whom it may concern:*

Be it known that I, WILLIAM H. HARDEN, residing at Quitman, in the county of Brooks and State of Georgia, have invented certain new and useful Improvements in Animal-Traps, of which the following is a specification.

My invention is an improved animal-trap intended especially for rats and the like, and seeks, among other improvements, to provide a simple novel construction of tripping and self-setting devices; and the invention consists in the novel constructions and combinations of parts, as will be hereinafter described, and pointed out in the claims.

Figure 1:
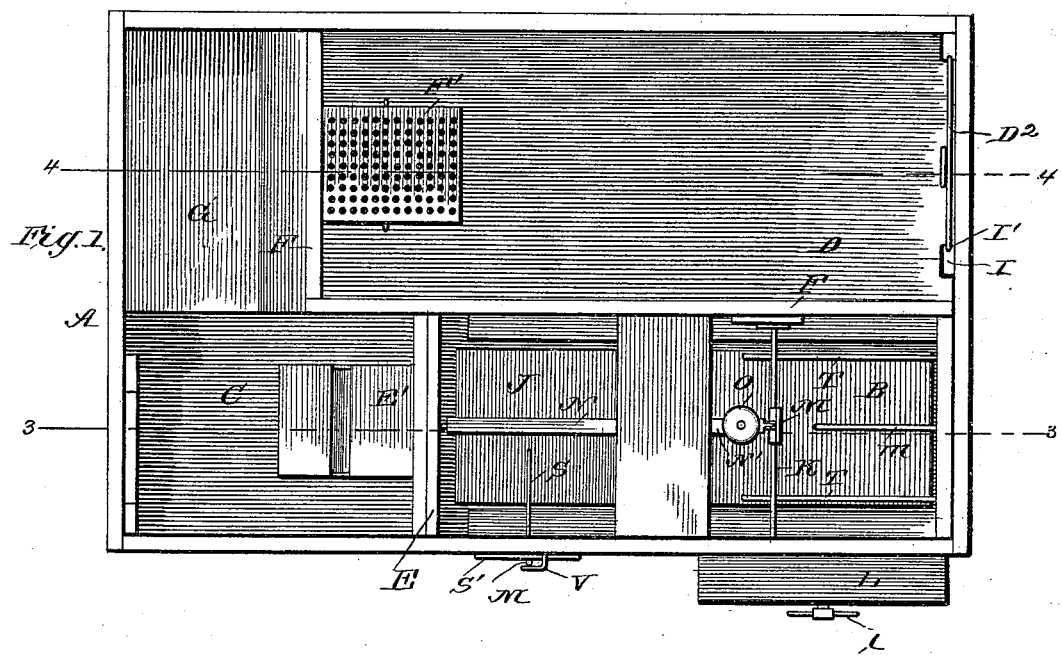
Figure 2:
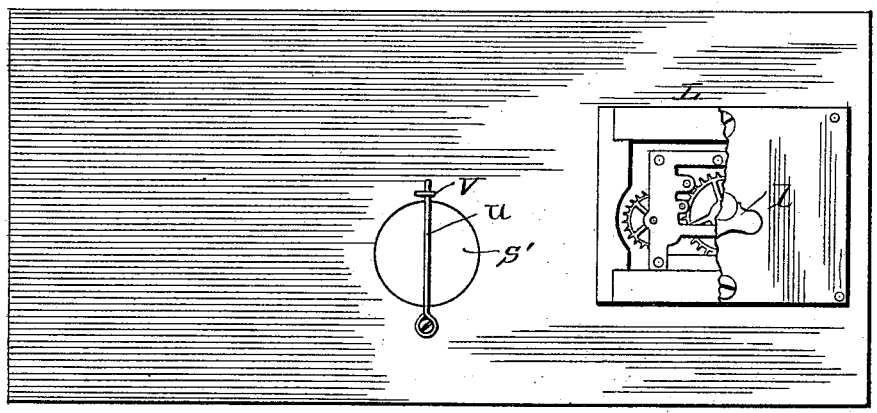
Figure 3:
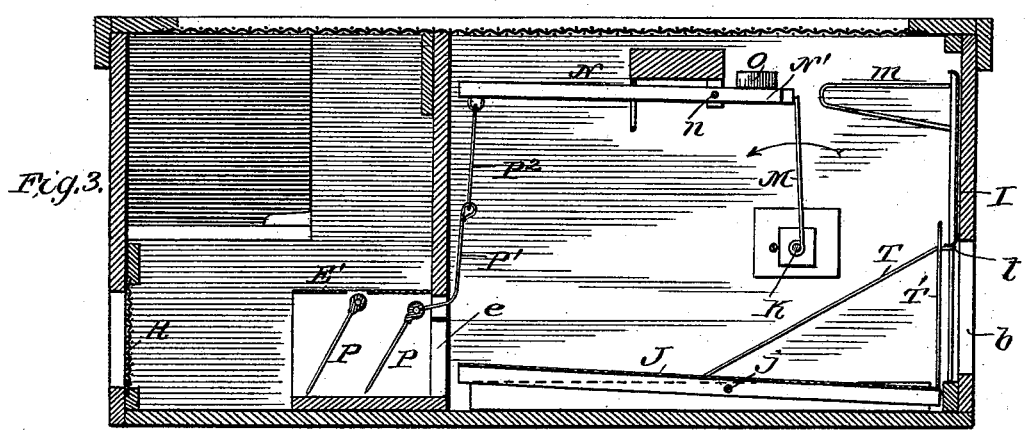
Figure 4:
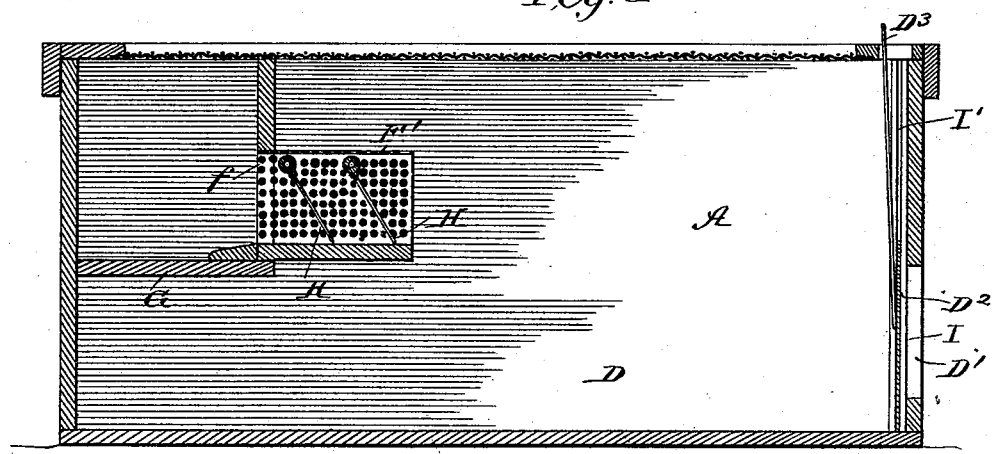
Figures 5, 6:
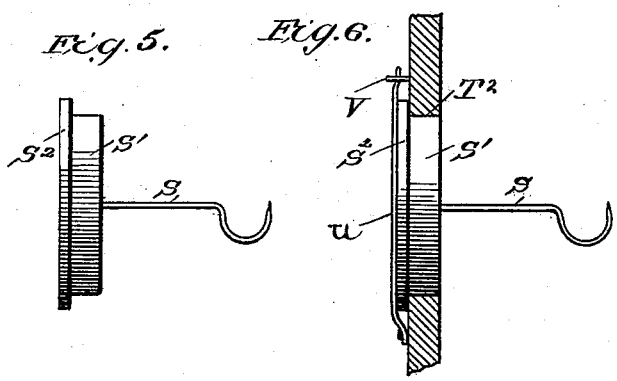

In the drawings, Figure 1 is a top plan view of my trap, the top being removed. Fig. 2 is a side view of the trap, part of the motor-casing being broken away. Fig. 3 is a vertical longitudinal section on about line 3 3 of Fig. 1. Fig. 4 is a similar section on about line 4 4 of Fig. 1. Fig. 5 is a detail view of the bait-holder, and Fig. 6 illustrates the manner of securing the bait-holder in the trap.

The box or case A may be of wood, metal, or other suitable material, and when made of wood is usually lined with sheet metal. The top of the case may be covered with wire-netting, as shown, or it may be closed in by an imperforate cover, as desired. I divide the case into three chambers or compartments, which for convenience of reference I shall term the "entrance-chamber" B, the "intermediate compartment" C, and the "cage" D. Partitions E and F serve, respectively, to separate the compartments B, C, and D. Such partitions E and F are pierced by openings *e f*, supplied with guideways or chutes E' F'. The opening F is elevated above the bottom of the cage D, a platform G being provided in the compartment C just below the opening F to permit the rat to readily get to and pass through the said opening, as will be readily understood. This opening F is guarded by a gate or gates H, two of which are shown and which open toward the cage and permit the rat to pass into, but not out of, such cage through the said opening. By elevating the opening F above the bottom of the cage the rats in the cage are prevented from clogging such opening. The entrance-chamber B has its inlet-opening *b* controlled by a self-closing door I, which is preferably arranged to slide vertically on suitable guides I' and to drop by gravity to closed position. The door I is held open by means of the pivoted platform J. The platform is pivoted between its ends at *j* and forms practically the bottom of the compartment B. The front end of this platform or end next the entrance *b* is the heavier, so that such end is normally depressed, and in such position the platform operates to support and hold the door open. To this end the platform is provided near its front end with uprights T', which are provided near their upper ends with projections *t*, which in the normal position of the platform fit below the door and hold the same open. In the construction shown the projections *t* are the extended ends of brace-rods T for the uprights T', and while such construction is preferred it is obvious that the projections may be provided in other ways, if desired.

In operation, the door being held open by the devices therefor, if a rat enters the chamber B and passes along the platform into the rear end thereof he will tilt the platform and release the door, which will automatically close and prevent the rat from passing out. This, it will be seen, is a completely-operating mechanism for trapping one rat; but in order to automatically reset the trap I provide the mechanism which I will now describe.

A shaft K is journaled in the trap-case and extends across the entrance-chamber a short distance in rear of the door. This shaft is given a rotary tension to move in the direction indicated by arrow by means of a motor L, which may be a clock-train arranged to be wound by a key *l*, as shown, or by any other suitable motor mechanism adapted to revolve the shaft K. An arm or plate M projects from the shaft K, and in the revolution of such shaft engages the under side of an arm *m*, projected from the rear side of the door I. Hence it will be seen that as the shaft K revolves, its arm M, by engaging arm *m* of the door I, will lift the door to open position, in which it will be held by the supporting projections before described. To hold the shaft from turning and to permit it to turn under certain circumstances is the object of the detent and releasing devices, which I will now describe. A detent N, consisting of a bar or lever, is pivoted at $n$ and has its front end N' normally projected into the path of the arm M and held in such position by the weight O. It will be seen, therefore, that the detent may operate to hold the shaft from turning and yet be moved to permit the shaft to revolve for a partial revolution. In order to release the detent from engagement with the arm M, I provide connections between the first gate P, which controls the chute E', and the detent, so that the tilting of such gate as the rat passes through it will also tilt the detent N. In effecting such connections the gate P has a crank-arm P' connected by a link P² with the rear end of the detent, so that as the gate P is lifted the rear end of the detent will be depressed. The chute E' has a second gate P, the function of which is to guard the gate P and prevent the rats in compartment C from partially lifting the gate by their teeth and so running the clock-work or other motor down.

The general operation of the trap is as follows: The rat, entering the opening $b$, passes onto the platform and along the same toward the bait, which is arranged near the rear end of the platform and is supported in the manner presently described. The weight of the rat on the rear end of the platform tilts such platform and releases the door I, which is thus closed, preventing the rat's escape. Seeking an exit the rat will pass through the chute E and trip the first gate thereof, which will operate the detent and release the shaft and permit the same to revolve to open the door and reset the trap, as will be understood.

An opening R, covered by net-work or other transpicuous cover, is formed in the wall of compartment C in line with the chute E' to give light in the direction of the said chute. From the intermediate compartment C the rat will pass through the chute F' into the cage D, which has an outlet-opening D', provided with a sliding door D², the rod D³ of which projects above the top of the trap-case, so that the outlet-door can be conveniently opened. The bait-support includes a hooked rod S, projected from a block S', which fits in an opening T in the side of the case and has a flange S² at its outer edge, which laps against the case.

When the block is fitted in the opening T, its flange S² laps against the case and the block is secured by the rod M, held at one end to the case and extended across the block and secured at its opposite end by a block V. It will be seen that by this construction the bait can be conveniently inspected or replenished.

The arm or plate M may be secured to the shaft K by a set or thumb screw, so that such arm may be conveniently removed to permit the motor mechanism to be easily and completely detached from the casing when so desired.

Having thus described my invention, what I claim, and desire to secure by Letters Patent, is—

1. A trap comprising an entrance-chamber having an inlet and an outlet, a door controlling the inlet, a motor by which said door may be adjusted to open position, a detent for restraining the movement of said motor, a gate controlling the outlet from the entrance-chamber, and connections between the said gate and detent, whereby the tilting of the gate will release the detent, substantially as set forth.

2. In a trap, the combination of the casing or box, the door for closing the inlet-opening thereof and provided with a rearwardly-projected arm, the motor having a shaft provided with an arm not connected with but arranged to engage that of the door during a portion of the revolution of the shaft, a detent for restraining the said motor, and releasing devices for freeing the said detent, all substantially as and for the purposes set forth.

3. In a trap, the combination of the self-closing door, the tilting platform provided with devices by which to support the said door open and to release the same, and motor mechanism by which to readjust the door to set the same, substantially as set forth.

4. In a trap, the combination of the door, the motor mechanism by which the said door may be adjusted to set position, the detent for restraining the said motor and the hinged or pivoted gate, and connections between the said gate and detent, whereby the tilting of the gate will release the detent, substantially as set forth.

5. In a trap, the combination of the box or casing, the door controlling the inlet-opening, the motor by which to readjust the door to set position, a detent by which to restrain the said motor, the chute having a pivoted gate connected with said detent, and a second gate by which to guard the first gate, all substantially as set forth.

6. In a trap, the combination, with the case or box and the inlet-door controlling the entrance thereto, of the motor, the detent by which to restrain the said motor, the pivoted or journaled exit-gate having a crank-like arm, and connections between the said arm and the detent, substantially as set forth.

7. The combination, in a trap, of the box or case, the door controlling the inlet thereto, provided with a rearwardly-projecting arm, the motor having a shaft provided with an arm to engage that of the door, the detent-bar pivoted between its ends and arranged at one end for engagement by the arm of said shaft, whereby to restrain the motor, and the gate controlling the outlet from the entrance-chamber and having an arm connected with the detent-bar, whereby to adjust the same out engagement with the shaft-arm, all substantially as set forth.

8. In a trap, the combination of the box or case having an opening and the bait-support having a block fitted and removably held in the said opening, all substantially as and for the purposes set forth.

WILLIAM H. HARDEN.

Witnesses:
JAMES D. WADE, Jr.,
F. L. JONES.